United States Patent

[11] 3,633,229

| [72] | Inventor | Frederick W. Braatz<br>Box 323, Boyes Hot Spring, Calif. 95416 |
|---|---|---|
| [21] | Appl. No. | 49,231 |
| [22] | Filed | June 24, 1970 |
| [45] | Patented | Jan. 11, 1972 |

[54] CAMPERS D. U. O.
2 Claims, 2 Drawing Figs.

[52] U.S. Cl. .................................................. 7/14.55
[51] Int. Cl. ................................................ B25b 7/22
[50] Field of Search ............................................ 7/14.55,
14.1, 1, 1 F, 1 L

[56] References Cited
UNITED STATES PATENTS

| 827,898 | 8/1906 | Wiener .......................... | 7/14.55 |
| 3,074,752 | 1/1963 | Kirkel ........................... | 7/14.55 |
| 3,404,412 | 10/1968 | Ryan ............................ | 7/14.55 |

FOREIGN PATENTS

| 544,107 | 6/1922 | France ......................... | 7/14.55 |
| 696,932 | 11/1964 | Canada ........................ | 7/14.55 |

Primary Examiner—James L. Jones, Jr.
Attorney—George B. White

ABSTRACT: A combination tool for use by campers and the like. This device consists of a scoop portion, the upper portion of which receives the ax blade, the ax handle serving as a handle both for the ax blade and the scoop portion of the device.

PATENTED JAN 11 1972

3,633,229

FREDERICK W. BRAATZ

CAMPERS D. U. O.

This invention relates to hand tools, and more particularly to an ax and shovel combination.

It is therefore the primary purpose of this invention to provide a tool for campers and the like which will consist of a scoop portion serving as a shovel and an ax portion for chopping wood, the blade of the ax being secured within the upper extremity of the scoop portion when not in use, the handle of the ax serving as a handle for the scoop portion.

Another object of the present invention is to provide a combination tool of the type described which will have bolt and wing nut fasteners to secure the ax blade within the upper extremity of the scoop portion of the device.

A further object of this invention is to provide a combination tool that will be only one implement when the ax portion is secured within the scoop portion.

Other objects of the present invention are to provide an ax and shovel combination which is simple in design, inexpensive to manufacture, rugged in construction, easy to use and efficient in operation.

These and other objects will be readily evident upon a study of the following specification and the accompanying drawing wherein.

Figure 1:
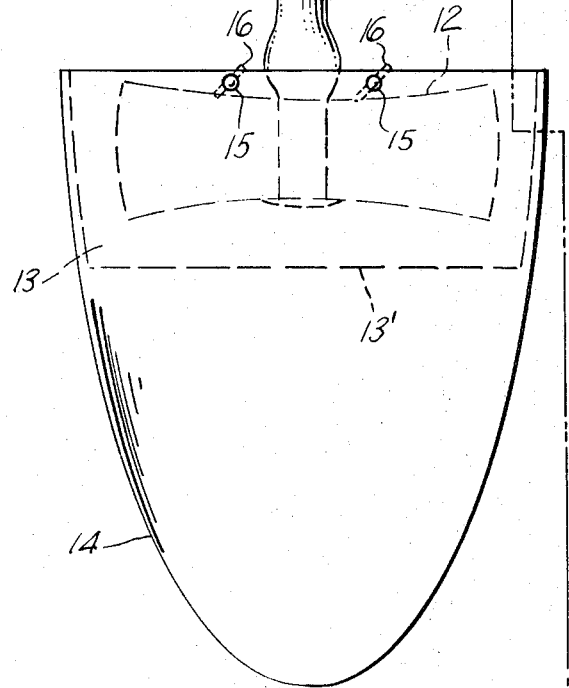
FIG. 1 is a front view of the present invention shown in elevation.
Figure 2:
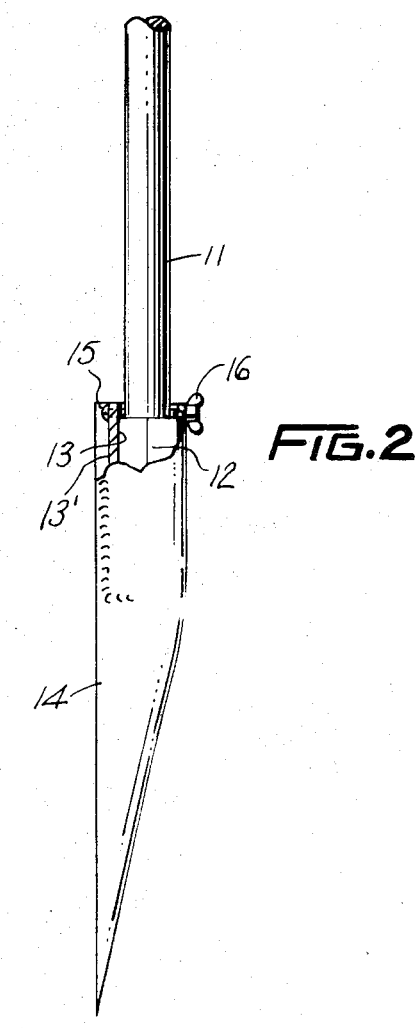
FIG. 2 is a view taken along the lines 2–2 of FIG. 1.

According to this invention, an ax and shovel combination tool 10 is shown to include an elongated handle 11 which is secured in the usual fashion, within a double-edged blade 12.

When tool 10 is used as a shovel blade 12 is secured within the pocket 13 formed by the plate 13' which is welded to the scoop 14. Blade 12 remains stationary within pocket 13 by means of a pair of spaced-apart bolts 15 receiving wing nut fasteners 16 which may be removed when cutting wood is desired.

It shall be noted that bolts 15 after being removed entirely from tool 10 in order to remove the blade 12 from within pocket 13 of scoop 14.

What I now claim is:

1. An ax and shovel combination tool, comprising an elongated handle for holding the tool, an ax blade carried by said handle serving as a means for cutting wood and extending transversely to opposite sides of said handle, a scoop portion carried by said tool, said scoop portion having pocket means for encasing said blade of said tool, bolt and nut fastener means carried by said tool providing a means of securing said blade within said tool, said scoop portion of said tool when used as a shovel having said blade portion secured within said pocket by said bolts at the upper extremity of said scoop, and said pocket being formed by plate means secured to said scoop thus defining an opening for the receiving of said blade, said blade being held stationary by said bolts fastened through said scoop and said plate defining said pocket which receives said blade, said bolts being spaced apart, one on each side of said handle carrying said blade, and when said blade is securely locked within said pocket of said scoop, said handle being usable by the user in order to use said tool as a shovel.

5. The combination according to claim 1, wherein said blade and said handle may be used as an ax for cutting by entirely removing said bolts from said scoop and said plate forming said pocket after removing said wingnut therefrom.

* * * * *